United States Patent
Claussen et al.

(10) Patent No.: US 9,599,527 B2
(45) Date of Patent: Mar. 21, 2017

(54) DYNAMIC PRESSURE METHOD OF DETECTING FLAME ON/OFF IN GAS TURBINE COMBUSTION CANS FOR ENGINE PROTECTION

(71) Applicant: Siemens Energy, Inc., Orlando, FL (US)

(72) Inventors: Heiko Claussen, North Brunswick, NJ (US); Nancy H. Ulerich, Longwood, FL (US); Zainul Momin, Winter Park, FL (US); Justinian Rosca, West Windsor, NJ (US)

(73) Assignee: Siemens Energy, Inc., Orlando, FL (US)

( * ) Notice: Subject to any disclaimer, the term of this patent is extended or adjusted under 35 U.S.C. 154(b) by 167 days.

(21) Appl. No.: 14/691,605

(22) Filed: Apr. 21, 2015

(65) Prior Publication Data
US 2016/0313203 A1    Oct. 27, 2016

(51) Int. Cl.
*G01M 15/14* (2006.01)
*G01L 19/06* (2006.01)

(52) U.S. Cl.
CPC ......... *G01L 19/0663* (2013.01); *G01M 15/14* (2013.01)

(58) Field of Classification Search
CPC ...... G01H 17/00; G01M 15/14; G01M 15/12; F23M 11/045; G01N 2291/0254; G01N 29/00
USPC ..................................................... 73/112.01
See application file for complete search history.

(56) References Cited

U.S. PATENT DOCUMENTS

| | | |
|---|---|---|
| 5,544,478 A | 8/1996 | Shu et al. |
| 5,719,791 A | 2/1998 | Neumeler et al. |
| 5,784,300 A | 7/1998 | Neumeler et al. |
| 6,273,064 B1 | 8/2001 | Scholl et al. |
| 6,840,218 B2 | 1/2005 | Scholl et al. |
| 6,976,351 B2 | 12/2005 | Catharine et al. |

(Continued)

FOREIGN PATENT DOCUMENTS

| | | |
|---|---|---|
| EP | 1116945 A2 | 7/2001 |
| EP | 1116946 A2 | 7/2001 |

(Continued)

OTHER PUBLICATIONS

Non-patent literature citations 1-9 are of related applications before the US Patent and Trademark Office: "Active Temperature Monitoring in Gas Turbine Engine Combustor", filed Dec. 18, 2013, U.S. Appl. No. 14/132,001.

(Continued)

*Primary Examiner* — Freddie Kirkland, III

(57) ABSTRACT

The flame status of a group of gas turbine combustors is acoustically monitored using dynamic pressure sensors within the combustor. Dynamic pressure sensor output signals are received from the sensors and processed to determine flame status. The signals are processed both by performing a correlation analysis within each combustor and by applying a wavelet-based flame detection algorithm to each output signal. A flame is determined to be present based on the correlation analysis and the wavelet-based flame detection algorithm. The wavelet-based flame detection algorithm is chosen based on whether the gas turbine combustors are in an ignition phase or a monitoring phase.

20 Claims, 11 Drawing Sheets

(56) References Cited

U.S. PATENT DOCUMENTS

| | | |
|---|---|---|
| 7,148,611 B1 | 12/2006 | Liu |
| 7,210,297 B2 | 5/2007 | Shah et al |
| 7,451,601 B2 * | 11/2008 | Taware ............... F23N 5/16 60/39.281 |
| 7,503,177 B2 | 3/2009 | Bland et al. |
| 7,743,599 B2 | 6/2010 | Taware et al. |
| 7,853,433 B2 * | 12/2010 | He ..................... F23N 5/242 60/772 |
| 7,927,095 B1 | 4/2011 | Chorpening et al. |
| 9,453,767 B2 * | 9/2016 | DeSilva ............... G01K 11/24 |
| 9,494,493 B2 * | 11/2016 | Claussen ............ F23N 5/16 |
| 9,500,563 B2 * | 11/2016 | Patrick ................ G01M 15/14 |
| 2003/0145829 A1 | 8/2003 | Scholl et al. |
| 2005/0107942 A1 | 5/2005 | Nomura et al. |
| 2006/0137353 A1 | 6/2006 | Lieuwen et al. |
| 2006/0254279 A1 * | 11/2006 | Taware ............... F23N 5/16 60/772 |
| 2007/0199328 A1 | 8/2007 | Shah et al. |
| 2008/0010966 A1 | 1/2008 | Taware et al. |
| 2009/0299695 A1 | 12/2009 | Subbu et al. |
| 2012/0150413 A1 | 6/2012 | Bunce et al. |
| 2014/0053574 A1 | 2/2014 | McConkey |
| 2015/0068294 A1 * | 3/2015 | Claussen ............ G01L 19/0663 73/112.01 |

FOREIGN PATENT DOCUMENTS

| | | |
|---|---|---|
| EP | 1293764 A2 | 3/2003 |
| EP | 1321655 A1 | 6/2003 |
| EP | 1605205 A2 | 12/2005 |
| EP | 1632718 A2 | 3/2006 |
| EP | 1752637 A2 | 2/2007 |
| EP | 1870680 A2 | 12/2007 |
| EP | 1209458 B1 | 1/2008 |
| EP | 2211102 A2 | 7/2010 |
| EP | 2249005 A2 | 11/2010 |
| FR | 2872282 A1 | 6/2004 |
| WO | WO9514226 A1 | 5/1995 |
| WO | WO2010036285 A1 | 4/2010 |
| WO | WO2014166680 A1 | 10/2014 |

OTHER PUBLICATIONS

"Temperature Measurement in a Gas Turbine Engine Combustor", filed Mar. 14, 2013, U.S. Appl. No. 13/804,132.

"Active Measurement of Gas Flow Temperature, Including in Gas Turbine Combustors", filed Mar. 13, 2014, U.S. Appl. No. 14/207,741.

"Multi Functional Sensor System for Gas Turbine Combustion Monitoring and Control" filed Dec. 18, 2013, U.S. Appl. No. 14/109,992.

"Nonintrusive Performance Measurement of a Gas Turbine Engine in Real Time", filed Jul. 28, 2014, U.S. Appl. No. 14/341,950.

"Nonintrusive Transceiver and Method for Characterizing Temperature and Velocity Fields in a Gas Turbine Combustor", filed Jul. 28, 2014, U.S. Appl. No. 14/341,924.

"Active Measurement of Gas Flow Velocity or Simultaneous Measurement of Velocity and Temperature, Including in Gas Turbine Combustors" filed Mar. 13, 2014, U.S. Appl. No. 14/207,803.

"Flame Monitoring of a Gas Turbine Combustor Using Multiple Dynamic Pressure Sensors in Multiple Combustors", filed concurrently herewith.

Flame Monitoring of a Gas Turbine Combustor Using a Characteristic Spectral Pattern from a Dynamic Pressure Sensor in the Combustor, filed concurrently herewith.

"Signature Extraction Using Mutual Interdependencies", Heiko Claussen, et al., Pattern Recognition, vol. 44, Issue 3, ISSN 0031-3203, pp. 650-661, Mar. 2011.

"Combustion Dynamics Instrumentation", IMI Sensors, a PCB Piezotronics Div., 2010 PCB Group, Inc.

English Translation of WO2014/166680.

* cited by examiner

DYNAMIC PRESSURE METHOD OF DETECTING FLAME ON/OFF IN GAS TURBINE COMBUSTION CANS FOR ENGINE PROTECTION

CROSS-REFERENCE TO RELATED APPLICATIONS

This application incorporates by reference in its entirety as if fully set forth herein copending International Application PCT/EP2014/054524 entitled "Method for Monitoring a Flame State," filed on Mar. 10, 2014, published as International Publication No. WO/2014/166680 on Oct. 16, 2014.

This application incorporates by reference in their entirety as if fully set forth herein the following co-pending United States utility patent application:

"Single Dynamic Pressure Sensor Based Flame Monitoring of a Gas Turbine Basket" filed Oct. 14, 2014, Ser. No. 14/513,316;

This application also incorporates by reference in its entirety as if fully set forth herein U.S. Pat. No. 7,853,433, "Combustion Anomaly Detection Via Wavelet Analysis Of Dynamic Sensor Signals", issued Dec. 14, 2010.

BACKGROUND

1. Field of the Invention

The invention relates to methods and apparatus for monitoring the flame state in a combustion chamber of a gas turbine using dynamic pressure sensors. More specifically, it relates to methods and systems for monitoring for flame-out conditions in combustion chambers using dynamic pressure sensors arranged in a pressure influence zone of a combustor of the combustion chamber to determine a flame state in the combustor.

2. Description of the Prior Art

A gas turbine is a flow machine in which a pressurized gas expands. It comprises a turbine or expander, a compressor connected upstream thereof, and a combustion chamber positioned therebetween. The operating principle is based on the cycle process (Joule process): This compresses air by way of the blading of one or more compressor stages, subsequently mixes said air in the combustion chamber with a gaseous or liquid fuel, ignites and combusts the same. The air is also conducted into a secondary air system and utilized for cooling in particular components that are subject to extreme thermal stresses.

This results in a hot gas (mixture composed of combustion gas and air) which expands in the following turbine section, with thermal energy being converted into mechanical energy in the process and in the first instance driving the compressor. The remaining portion is employed in the shaft driving mechanism for driving a generator, a propeller or other rotating loads. In the case of the jet power plant, on the other hand, the thermal energy accelerates the hot gas stream, which generates the thrust.

Typically, a plurality of combustors is provided, arranged annularly around the turbine axis and having corresponding injector nozzles for fuel. In such a configuration the combustors can be arranged as individual combustors, referred to as baskets, which are connected only shortly before the entry into the turbine (referred to as a can or can-annular design), or the combustors can be arranged in a common ring-shaped combustion chamber (referred to as an annular design). When the gas turbine is started up, the fuel-air mixture in the respective combustion chamber is ignited by means of igniters. Thereafter the combustion takes place continuously.

The continuous monitoring of the flame, in particular in each individual combustor in the case of the can-type or can-annular-type design, is important for the operational safety of the gas turbine in order to avoid dangerous situations due to the ingress of unburnt fuel in the combustion chamber or the turbine outlet. In this case the monitoring of the flame state must be performed quickly so that no dangerous air-fuel mixtures are produced over a relatively long period of time. Response times of less than a second are desirable. In particular the igniting and extinguishing of flames must be reliably detected at any given time, especially also in situations such as a load throw-off, during powering down of the gas turbine, or in partial extinguishing of individual flames.

Optical and temperature-based systems are known for monitoring the flame state. Optical systems measure the light emitted by the flame directly and typically are comparatively quick. A disadvantageous aspect with systems of said type, however, is the susceptibility of the optical components to soiling by particles, dust, soot, oil, as well as water and condensation. The soiling reduces the flame detection capabilities of such systems as well as their reliability and operational availability.

As an alternative to such optical systems, systems have therefore been developed which are based on the dynamic measurement of the pressure in the pressure influence zone. A system of said type is described for example in U.S. Pat. No. 7,853,433 B2. In this case a piezoelectric pressure sensor is arranged in the pressure influence zone of each combustor. The time signal of the pressure sensor is digitized and subjected to a wavelet analysis. The wavelet analysis enables the flame state and a flame flashback to be detected based on the comparison of the normalized amplitudes of the wavelet coefficients with predetermined threshold amplitudes. In this case the signals are normalized using the mean value of all of the combustors, as a result of which the threshold value is specified. If said threshold values are exceeded it signifies a deviation from the normal state and consequently a change in the flame state, either the igniting or extinguishing of the flame or a flame flashback.

However, the method described in U.S. Pat. No. 7,853,433 B2 has the disadvantage that certain flame states are not detected. An extinction of all of the combustor flames will not be detected, for example.

To reduce costs it is desired to use already-existing sensors for reliable flame monitoring. Dynamic pressure sensors are available from the monitoring of the combustion dynamics and can be used for flame monitoring. Some current combustion dynamics monitoring systems utilize two dynamic pressure sensors per combustor. Future gas turbines will potentially utilize only one dynamic pressure sensor per combustor. To prevent the need for additional instrumentation and thus to keep a cost advantage, a need exists in the art to detect and monitor a turbine combustor flame using the available dynamic pressure sensors provided in a combustor.

A further need exists in the art to reliably detect a condition of simultaneous flame-out in all combustors.

An additional need exists in the art to robustly detect a simultaneous flame-out condition in any combustor during both ignition and steady-state operation of the gas turbine.

There is an additional need in the art to filter the acoustic data received from a sensor in a combustor to focus the analysis on specific, localized sound sources while disregarding background noise.

SUMMARY

Accordingly, it is an object of the invention to provide a more reliable and more robust detection of the flame state for each individual flame in the combustion chamber of a gas turbine.

It is a further object of the invention to provide methods and systems for reliably detecting and monitoring for a flame-off condition in individual combustors of a gas turbine combustor chamber.

Another object of the invention is to reliably detect and monitor a combustor flame by performing multiple detection algorithms based in different domains.

Exemplary embodiments of the invention feature a method for monitoring flame status in a plurality of combustors of a gas turbine engine. Dynamic pressure sensor output signals are received from dynamic pressure sensors arranged in the combustors, the dynamic pressure sensor output signals being indicative of acoustic oscillations within the combustors. For each of the dynamic pressure sensor output signals, a preprocessed time-domain signal is computing by digitizing and filtering the dynamic pressure sensor output signals. For each of the dynamic pressure sensor output signals, a preprocessed wavelet signal is also computed using a discrete wavelet transform.

A wavelet-based flame detection algorithm is applied to the preprocessed wavelet signals to determine a wavelet-based flame status for each of the dynamic pressure sensor output signals. For each combustor, a correlation analysis is performed on one or more of the preprocessed time-domain signals to determine a correlation-based flame status. The flame status is determined based on the correlation-based flame status and the wavelet-based flame statuses.

The wavelet-based flame detection algorithm may be selected based on fuel valve status for pilot oil valves and pilot gas valves feeding the combustors. For example, an algorithm for an ignition phase may be selected when a pilot oil valve is open for shorter than an oil ignition time or a pilot gas valve is open for shorter than a gas ignition time; an algorithm for a monitoring phase may be selected when a pilot oil valve is open for longer than the oil ignition time or a pilot gas valve is open for longer than a gas ignition time; and no algorithm is selected and the monitoring is terminated if both the oil pilot valve and the gas pilot valve are closed.

Other exemplary embodiments feature a system for monitoring a flame in a gas turbine engine combustion chamber. The system comprises a plurality of dynamic pressure sensors arranged for producing dynamic pressure sensor output signals indicative of acoustic oscillations within a plurality of combustors of the gas turbine engine combustion chamber. A processor is connected for receiving the dynamic pressure sensor output signals from the acoustic sensors.

The system also comprises computer readable media containing computer readable instructions that, when executed by the processor, cause the processor to perform operations comprising: for each of the dynamic pressure sensor output signals, computing a preprocessed time-domain signal by digitizing and filtering the dynamic pressure sensor output signal; for each of the dynamic pressure sensor output signals, computing a preprocessed wavelet signal using a discrete wavelet transform; applying a wavelet-based flame detection algorithm to the preprocessed wavelet signals to determine a wavelet-based flame status for each of the dynamic pressure sensor output signals; for each combustor, performing a correlation analysis on one or more of the preprocessed time-domain signals to determine a correlation-based flame status; and determining the flame status based on the correlation-based flame status and the wavelet-based flame statuses.

The respective objects and features of the exemplary embodiments of the invention may be applied jointly or severally in any combination or sub-combination by those skilled in the art.

BRIEF DESCRIPTION OF THE DRAWINGS

The invention is explained in more detail with reference to an exemplary embodiment illustrated in a drawing, in which.

Like parts are labeled with the same reference signs in all the figures.

DETAILED DESCRIPTION

Figure 1:
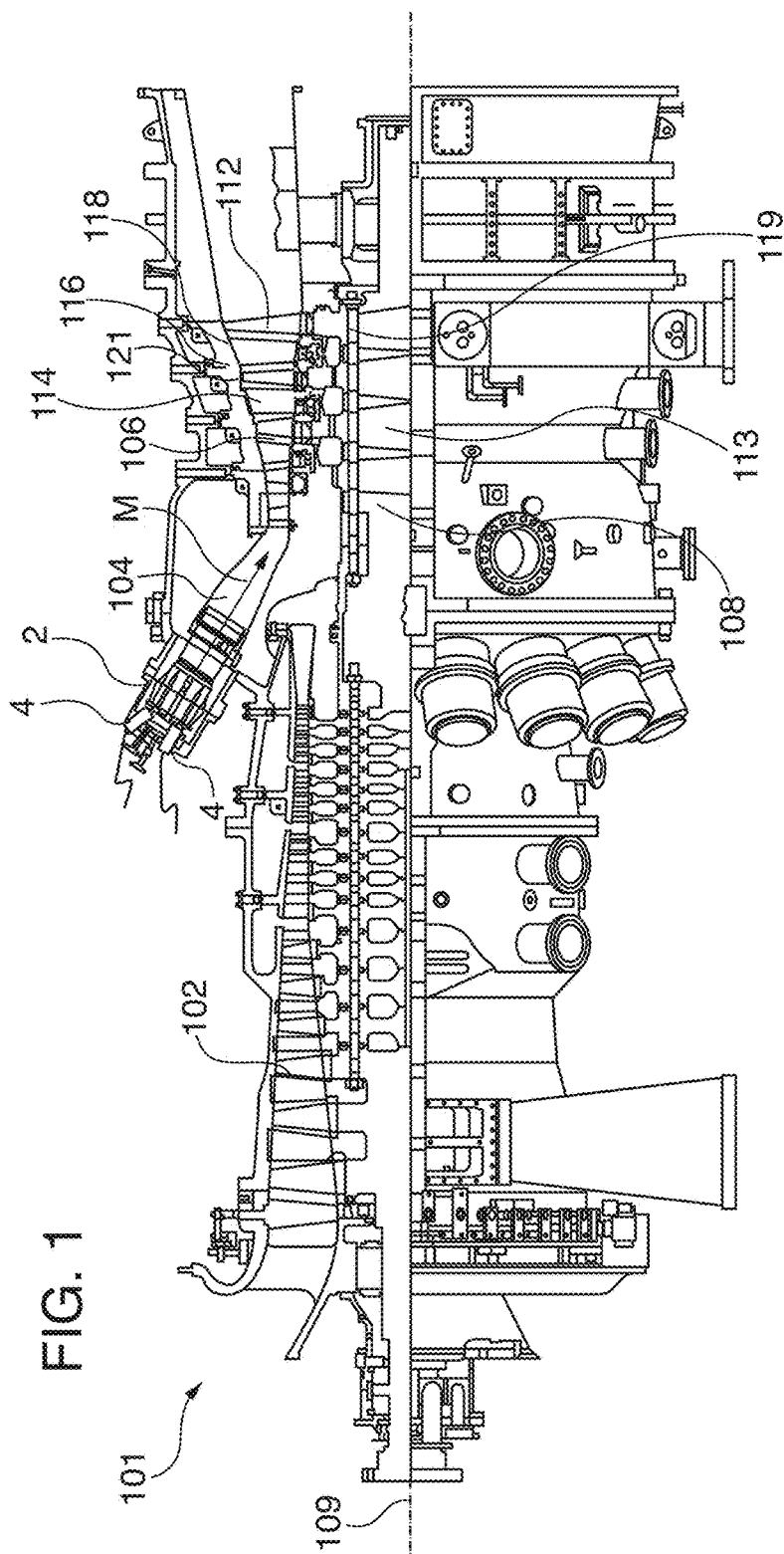
FIG. 1 shows a gas turbine.

FIG. 1 shows the gas turbine 101. The lower half of FIG. 1 shows a view from above, the upper half a cross-sectional view. A gas turbine 101 is a flow machine. It has a compressor 102 for combustion air, a combustion chamber 104, as well as a turbine unit 106 for driving the compressor 102 and a generator (not shown) or a work machine. Toward that end the rotating parts of turbine unit 106 and compressor 102 are arranged on the rotor 108, to which the generator or work machine is also connected and which is rotatably mounted around its central axis 109. The combustion chamber 104 implemented in a can-annular design in the exemplary embodiment comprises a number of tube-shaped individual combustors 2 which may include baskets. Each of the combustors 2 is equipped for combusting a liquid or gaseous fuel.

The turbine unit 106 has a number of rotatable moving blades 112. The moving blades 112 are part of the rotor 108 and are arranged annularly on turbine disks 113, thus forming a number of moving blade rings or rows. In addition the turbine unit 106 comprises a number of stationary guide vanes 114 which are likewise mounted annularly to a guide vane carrier 116 of the turbine unit 106, thus forming guide vane rows. In this arrangement the moving blades 112 serve to drive the rotor 108 through transfer of momentum from the working medium M flowing through the turbine unit 106. The guide vanes 114, in contrast, serve to guide the flow of the working medium M between in each case two succeeding moving blade rows or moving blade rings, viewed in the flow direction of the working medium M. A succeeding pair consisting of a ring of guide vanes 114 or a guide vane row and of a ring of moving blades 112 or a moving blade row is also referred to in this context as a turbine stage.

Each guide vane 114 has a platform 118 which is arranged as a wall element for fixing the respective guide vane 114 to a guide vane carrier 116 of the turbine unit 106. Each moving blade 112 is mounted in an analogous manner on a turbine disk 113 by way of a platform 119, which is also referred to as a blade root. In such an arrangement the platforms 118, 119 are components that are subject to comparatively severe thermal stresses and form the outer boundary of a hot gas duct for the working medium M flowing through the turbine unit 106. The rotor 1, which is enclosed by the hot gas duct, is also subject to extreme thermal stresses, in particular during transient processes such as the startup of the gas turbine 101.

A ring segment 121 is arranged in each case on a guide vane carrier 116 of the turbine unit 106 between the platforms 118, arranged spaced at a distance from one another, of the guide vanes 114 of two adjacent guide vane rows. The outer surface of each ring segment 121 is in this case likewise exposed to the hot working medium M flowing through the turbine unit 106 and in the radial direction is spaced apart by a gap from the outer end of the moving blades 112 disposed opposite thereto. The ring segments 121 arranged between adjacent guide vane rows in this case serve in particular as cover elements which protect the inner housing in the guide vane carrier 116 or other built-in housing parts from excessive thermal stress due to the hot working medium M flowing through the turbine 106.

As already described, the combustion chamber 104 is embodied in the exemplary embodiment as what is termed a can-annular combustion chamber, in which a plurality of combustors 2 arranged around the rotor 1 in the circumferential direction are arranged individually, leading into the turbine unit 106 on the outlet sides. Here, two described pressure sensors 4 per combustor 2 are arranged in each case in the respective pressure influence zone thereof, in this instance upstream of the fuel inlet. The shape of the combustion chamber is not critical for the applicability of the above-described method. The method is equally suitable for use in gas turbines 101 having other combustion chamber shapes such as e.g. annular-type combustion chambers.

If only one pressure sensor 4 is provided per combustor 2 or if one pressure sensor 4 fails, the signal of an adjacent combustor 2 can alternatively be used for the correlation calculation or an autocorrelation of the signal of a single pressure sensor 4 can be calculated and used.

This disclosure describes a comprehensive, integrated method to use dynamic pressure sensor signals included in existing gas turbine instrumentation to determine flame on and flame off in an engine. The described technique provides a robust system of algorithms developed to monitor flame status based on multiple data analysis techniques. The resulting system is an integrated system for robust flame detection in the complex gas turbine environment.

The technique described in this section exploits the existing dynamic pressure sensors that are mounted on each combustion basket and are normally used for engine protection against combustion dynamics. The technique determines combustion status and instabilities in an engine such as flame on/off, flashback, etc.

The multifunction sensor system uses raw, time domain combustion dynamic pressure sensor information measured within each combustor basket. That allows the existing dynamic pressure sensors to replace, for example, the optical flame detectors, saving instrumentation cost and maintenance cost. Overall, dynamic pressure sensor signals are measured as a function of time (t) on each basket (x) for each sensor on the basket (y).

Although operators have observed a correlation between combustion dynamics and the status and instabilities in the combustor, such as flame status, flashbacks, etc., it has been challenging to automate that functionality in a robust, reliable algorithm in the presence of normal combustion noise and upsets such as in-band dynamic events. The presently described system and technique provides that functionality.

To address the problem of acoustic signals in an individual basket varying with engine type, basket configuration, and operating conditions, the presently described system uses wavelet processing and regularization across baskets to provide a robust basis for interpretation of dynamic energies, allowing estimation of relative flame status in each basket.

To avoid the false detection of combustion events caused by in-band combustion dynamics, the presently described system uses adaptive filtering to create a robust solution preventing in-band dynamics from upsetting the detection of a true combustion event.

The baseline dynamic pressure signals vary from engine to engine and vary with change in the operating regime. The presently described system and technique use adaptive thresholds based on recent sensor data, ensuring that engine-to-engine variation in noise background or differences in the dynamic noise background level between various operating regimes (e.g., oil fired, gas fired, full speed no load, ramp up, full speed full load) do not interfere with the decision logic on flame detection.

Although the basket status is used comparatively to assess many operational states, the status when all baskets have a flame-out cannot be detected in that way. A method of correlating the individual signals within a basket or an individual signal to itself, therefore, has been incorporated to assure the total flame-out situation is detectable. The technique uses dynamic signal correlations between baskets and/or within a basket to refine the detection of shut-down states.

Robustness is necessary for safety-critical functions such as flame monitoring. The presently described systems and techniques combine all of the above functions to ensure robust operation in real-world situations.

The following describes embodiments for the deployment of a multifunction sensor system for use in detecting flame status in gas turbine engines. The existing raw, time domain dynamic pressure sensor data is used, along with the fuel valve position for oil and gas, to output flame on/off status. The binary indication is fed directly to the existing failsafe processor that currently uses the optical flame detector input. The use of the described system and technique eliminates the need for flame detectors, saving first time engine costs and LTP costs on each engine.

Figure 2:
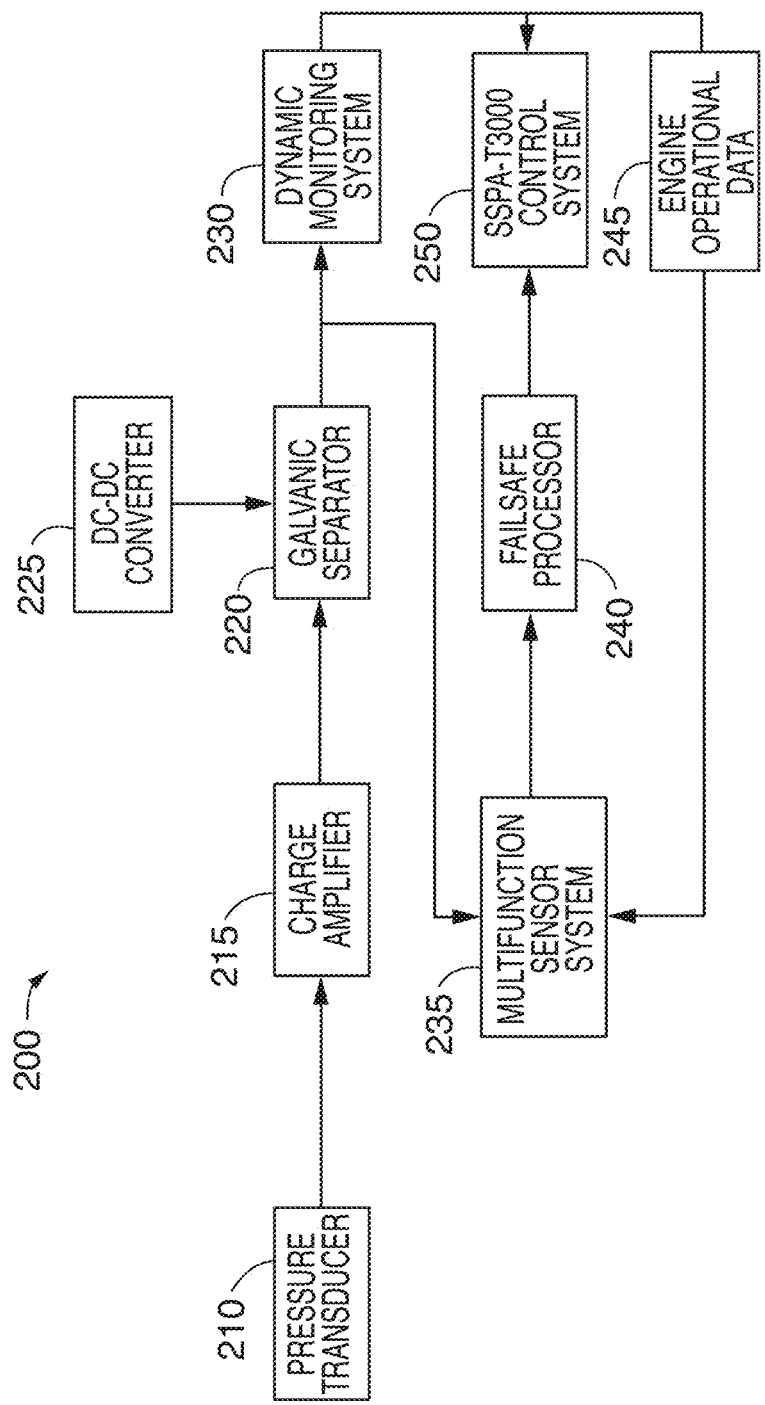
FIG. 2 is a block diagram showing integration of the disclosed system with a gas turbine engine control system according to one embodiment of the invention.

The described flame detection system may be used with an existing instrumentation and an existing control system. A block diagram 200, shown in FIG. 2, illustrates how the systems interface according to embodiments of the disclosure. Data is collected by dynamic pressure sensor transducers 210 such as CP232 high temperature dynamic pressure sensors available from Vibro-Meter SA of Fribourg, Switzerland. A charge-based signal is carried by a softline low noise cable such as a Vibro-Meter EC222 cable to a charge amplifier 215, such as an IP704 amplifier, also available from Vibro-Meter SA. A current-modulated signal is then transmitted from the charge amplifier 215 to a galvanic separation unit 220 (e.g., Vibro-Meter GSI 122/124) that provides power to the sensors from a DC-DC converter 225 and separates the signals from the frame voltage. The voltage-based signal from the galvanic separator 220 is transmitted, as is known in the art, to a dynamic monitoring system 230 such as a Vibro-Meter VM600, which provides combustion dynamics monitoring data to the turbine control system 250, which is in this case a Siemens SPPA-T3000 control system.

The voltage-based signal from the galvanic separator 220 is also transmitted to a multifunction sensor system 235, which performs aspects of the present disclosure. In one example, the multifunction sensor system 235 is instantiated by LabView software executing on National Instruments control and data acquisition hardware, available from National Instruments Corporation of Austin, Tex. The multifunction sensor system 235 also receives engine operational data 245 including fuel valve on/off signals, from the turbine control system 250. The output of the multifunction sensor system 235 is individual basket flame on/off indications similar to those from known optical flame detectors that are currently in use. That output feeds a failsafe processor 240 associated with the SSPA-T3000 control system 250. Other hardware configurations may alternatively be deployed.

The presently disclosed techniques and systems detect flame on and off using two separate methods or algorithms that are deployed in parallel. It is also possible to use the algorithms independently. The final configuration of algorithms depends on the needs for safety and reliability. The first algorithm is a baseline multifunction sensor method using the energy (as determined using a wavelet analysis) of the dynamic pressure in the frequency region impacted by the flame (approximately 100-200 Hz) and the deviation of that energy between combustion baskets, to determine the flame condition in each basket. The second algorithm is a correlation method. The correlation method assumes that two dynamic pressure signals, measured in each basket, are correlated if there is a flame present and uncorrelated if the flame is out, since there is only background noise when the flame is out. If only one dynamic pressure signal is available per basket, the multifunction sensor algorithm may operate without the current correlation algorithm or may operate with an autocorrelation algorithm.

The presently disclosed technique deploys both those methods in parallel, operating in a failsafe mode. That is, the system reports flame out if either algorithm indicates flame out. Details regarding how this concept is deployed in a complex, dynamic engine environment with in-band combustion dynamics, engine noise, and possible dynamic pressure sensor failures, are described in the following sections.

Overall Algorithm Description

Figure 3:
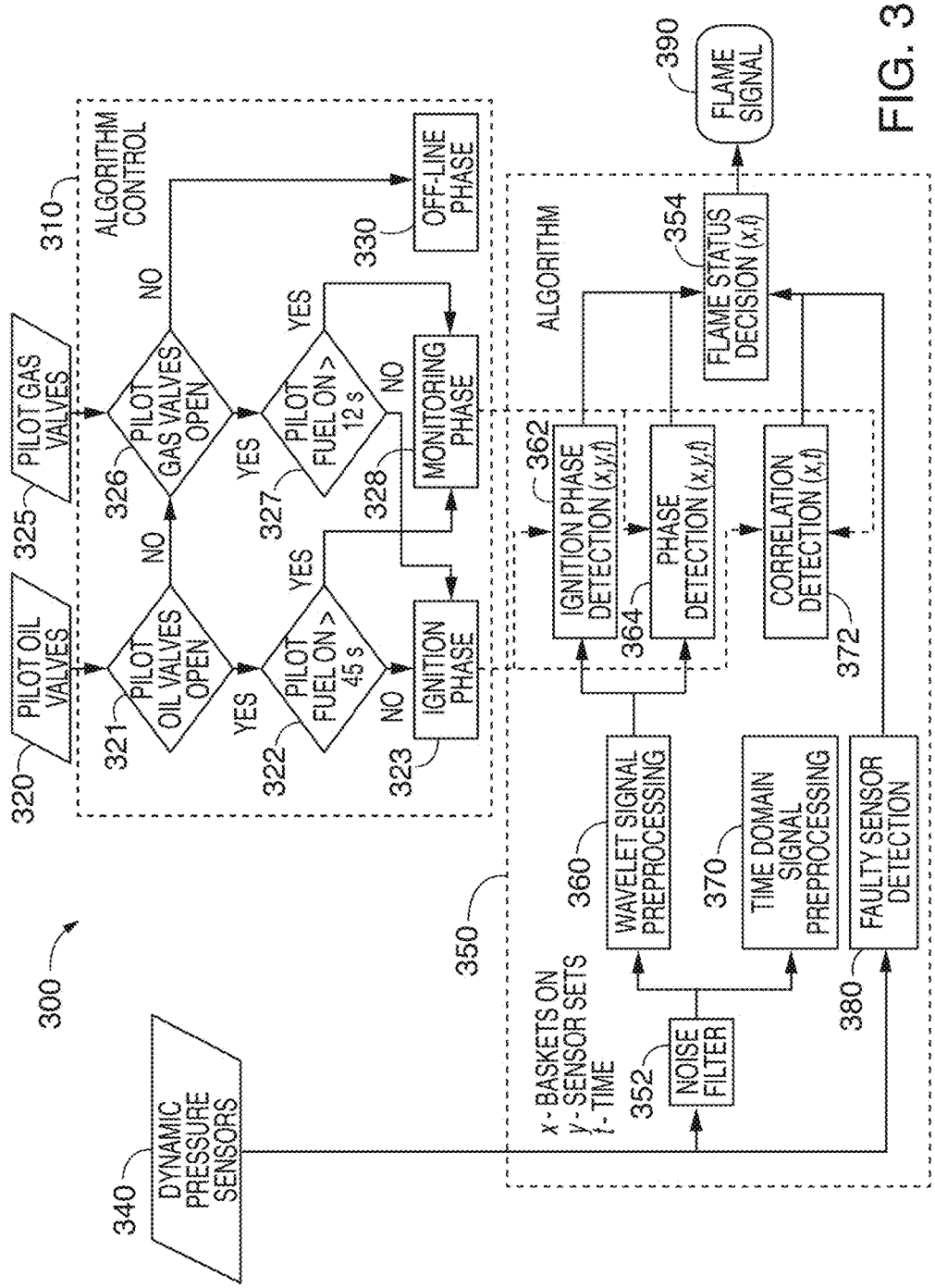
FIG. 3 is a block diagram showing operation and logic flow of a dynamic pressure sensor monitoring system according to one embodiment of the invention.

Aspects of the present disclosure for detecting flame on or off are described below. An overall flow chart 300, presented in FIG. 3, shows how the system functions at the highest level. Included are elements of the algorithm 350 itself, as well as elements used in algorithm control 310. The details of algorithmic steps are defined in subsequent FIGS. 7-11.

Overall, dynamic pressure sensor signals from dynamic pressure sensors 340 are measured as a function of time (t) on each basket (x) for each sensor on the basket (y). The sensor readings are initially run through a fault detection algorithm 380 to determine if a sensor has failed. The baseline method of detection then proceeds as follows.

Figure 4A:
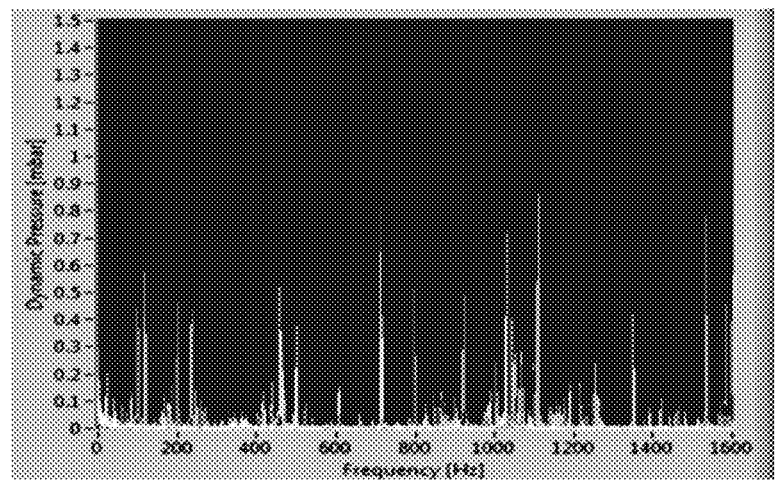
FIGS. 4A and 4B show a raw signal and a filtered signal, respectively, from a dynamic pressure sensor monitoring a combustor in an off-line phase according to one embodiment of the invention.
Figure 4B:
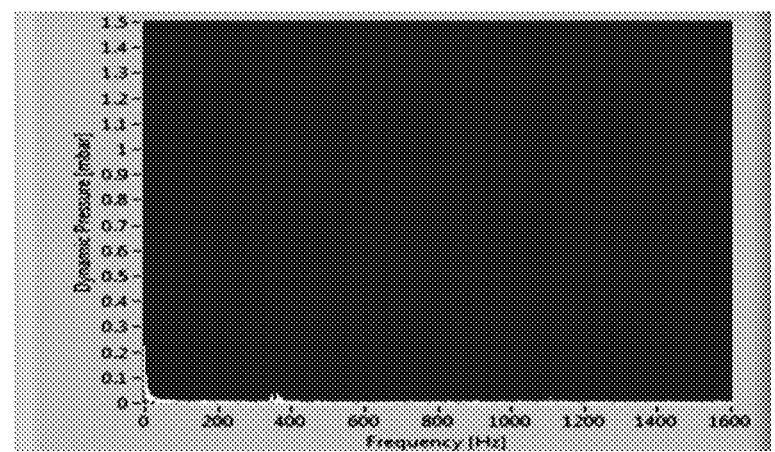
Figure 5A:
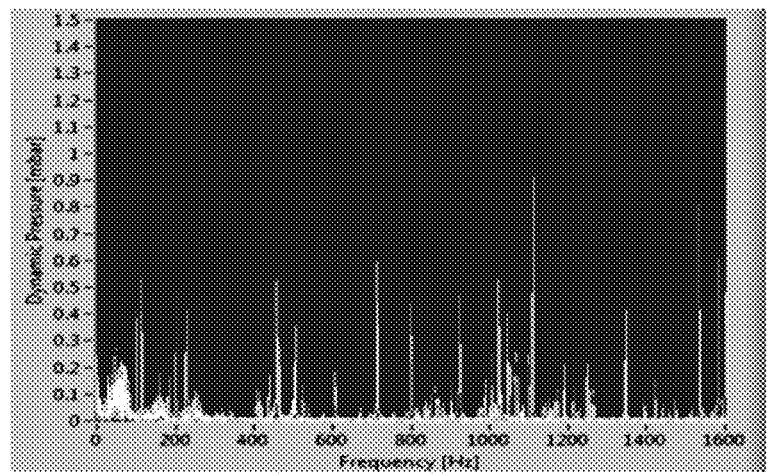
FIGS. 5A and 5B show a raw signal and a filtered signal, respectively, from a dynamic pressure sensor monitoring a combustor in an ignition phase according to one embodiment of the invention.
Figure 5B:
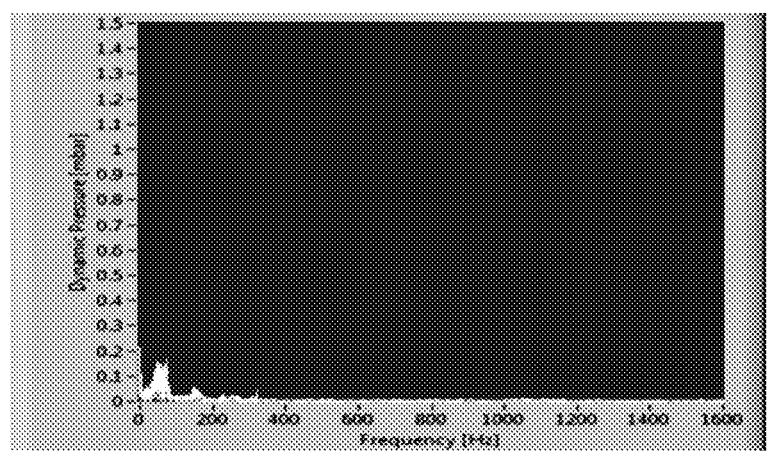
Figure 6A:
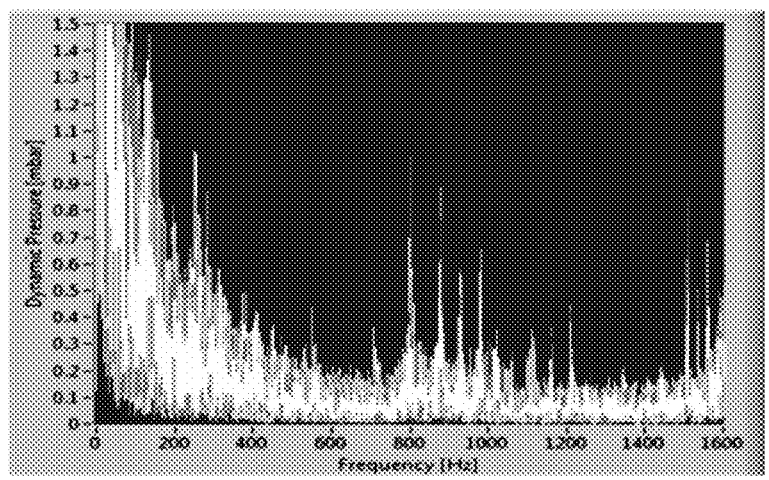
FIGS. 6A and 6B show a raw signal and a filtered signal, respectively, from a dynamic pressure sensor monitoring a combustor in a post-ignition monitoring phase according to one embodiment of the invention.
Figure 6B:
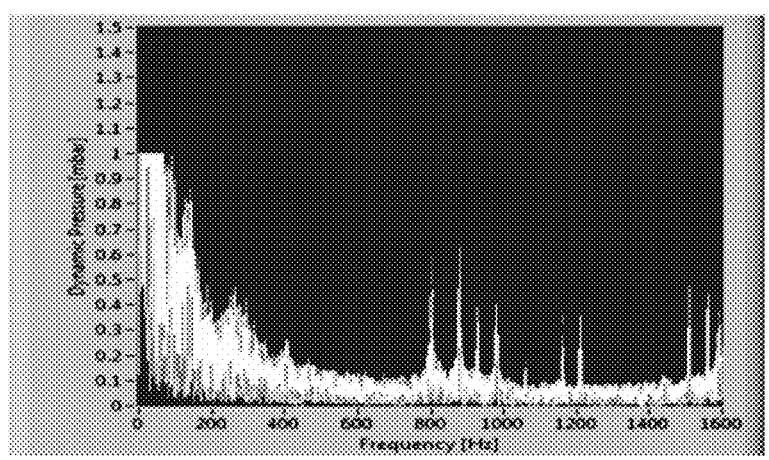

Data from the sensors 340 is filtered by a noise filter 352 to remove narrow band distortions and combustion instabilities. The narrow band distortions are removed by limiting the amplitude of each frequency component to 75% of the highest level of all baskets, and also using an established maximum of 1 mbar. That ensures that a high energy, narrow band signal does not negatively affect the flame decision of the algorithms. FIGS. 4-6 show the effect of that filtering. An unfiltered signal measured during the off-line phase of a test run is shown in FIG. 4A. The same signal after filtering is shown in FIG. 4B. Similarly, unfiltered and filtered versions of a signal measured during the ignition phase of a test run are shown in FIGS. 5A and 5B, respectively, and unfiltered and filtered versions of a signal measured during the post ignition phase of a test run are shown in FIGS. 6A and 6B, respectively. The post ignition period has intense dynamic pressure amplitudes in low frequencies that are caused by background noise, rather than the flame. The filtering limits the maximum impact of those frequencies to 1 mbar, focusing analysis on frequencies with lower noise.

The wavelet algorithm of the overall method is processed differently depending on an engine operation phase definition. The phase of the engine operation is defined by the time after which the fuel valves opened. The decision logic that defines the period of engine operation is shown in the algorithm control section 310 of the flow chart 300 (FIG. 3). The algorithm criteria duplicate the engine operation criteria. During gas operation, as determined by decision 326 based on a status of the pilot gas valves 325, the engine is allowed 12 seconds after the pilot valve opens to ignite, as indicated in decision 327. During this first 12 seconds after opening the gas fuel valve, the engine status is identified as being in an ignition phase 323 because during this time, flame on is not required to continue operation. As a result, in the wavelet algorithm, the ignition phase detection alternative 362 is selected. After 12 seconds, all baskets should have flame on and the engine status is identified as in a monitoring phase 328. Consequently, in the wavelet algorithm, the monitoring phase detection alternative 364 is selected. If all baskets do not have flame indication after the 12 second period, the engine is shut down.

In oil fired operation, as determined by decision 321 based on a status of the pilot oil valves 320, the period allocated for ignition is 45 seconds, as indicated in decision 322. In both the oil and the gas cases, the algorithm makes a decision based on the last 2 seconds of the ignition period. If neither the pilot oil valves nor the pilot gas valves are determined to be open by decisions 321, 326, then the engine status is identified as being in an off-line phase 330.

The wavelet algorithm separates the data analysis periods into ignition and post ignition or monitoring periods because it processes the data differently in those periods. In the ignition period, it is critical to detect lack of ignition before moving onward. In that period, the wavelet algorithm is more sensitive to the amplitude of the dynamic signal, and that is closely related to ignition. After ignition, widely varying combustion dynamics occur. The algorithm is designed, therefore, to be less sensitive to signal amplitude and focuses on the signal variation basket-to-basket.

As shown in the algorithm 350 of FIG. 3, after processing by the noise filter 352, the two techniques are deployed in parallel to determine flame status: the wavelet method depicted in the upper flow path including elements 360, 362, 364 and the correlation method depicted in the lower flow path including elements 370, 372. The algorithm bases a flame status decision on both the wavelet and the correlation analyses, and outputs a flame signal 390 indicating flame status. The wavelet method will be described first, and then the details of the correlation method will be provided.

Wavelet Analysis Technique

Figure 7:
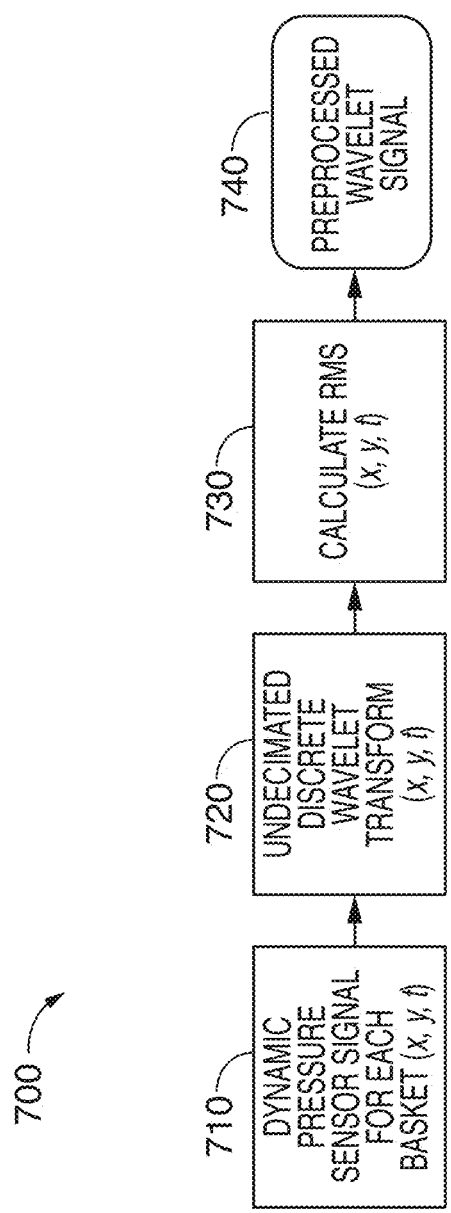
FIG. 7 is a flow chart showing wavelet signal preprocessing according to one embodiment of the invention.

The wavelet method uses a wavelet signal preprocessing 360 (FIG. 3), as shown in detail in the flow chart 700 of FIG. 7. The filtered dynamic pressure sensor signal 710 for each basket is converted into a time-frequency domain signal using an undecimated discrete wavelet transform (UWT) 720. The wavelet component is selected that represents frequencies of 100 to 200 Hz. The root mean square (RMS) 730 of that filtered time-frequency domain signal is called the Preprocessed Wavelet Signal (PWS) 740. The PWS is used to determine flame on or flame off by two different algorithms, dependent on whether the engine is in the ignition period or the post ignition monitoring period.

The method of determining whether flames in individual baskets are on or off differs in the ignition period from the post ignition monitoring period. In the ignition period algorithm 800, shown in FIG. 8, both the spread and the amplitude of the PWS 810 are used to determine if a basket was successfully ignited. That technique differentiates ignition from the off-line state where there may be a small spread between the baskets' dynamic pressure signals, which may have low amplitudes. The baskets are only considered successfully ignited if there is a significant dynamic pressure level, and a low spread between the baskets. The PWS is smoothed by processing it in time increments that are exponentially combined, such as in an exponential moving average 815. That helps to prevent small upsets in dynamics from causing false flame outs.

During ignition, it is important to see all upsets that indicate that the flame is not ignited. For that purpose, a flame ignition mapping function 820 utilizes the arctangent of the difference of the PWS and its median to enhance differences between a basket's signal and the median of all baskets. The result of the function is called the flame ignition signal (FI) 825, and it is mathematically defined as $$FI = \frac{1}{\pi}\tan^{-1}(a \cdot PWS - c \cdot \text{median}(PWS_{1 \text{ to } x})) - 0.5$$

The parameters a and c are empirically set at a=10 and c=8 to trade off the relative importance of the value of the spread in detecting basket differences and PWS signal amplitude that indicates flame activity. x is the number of baskets or combustors in the combustion chamber. If a basket's flame intensity is lower than some threshold, as determined at decision 830, the flame is determined as off, and a flame ignition signal of 0 is output at 840. Otherwise, a flame ignition signal of 1 is output at 835, indicating a flame-on condition. In one embodiment, the parameters a and c are automatically set and adjusted from the data being processed.

Figure 9:
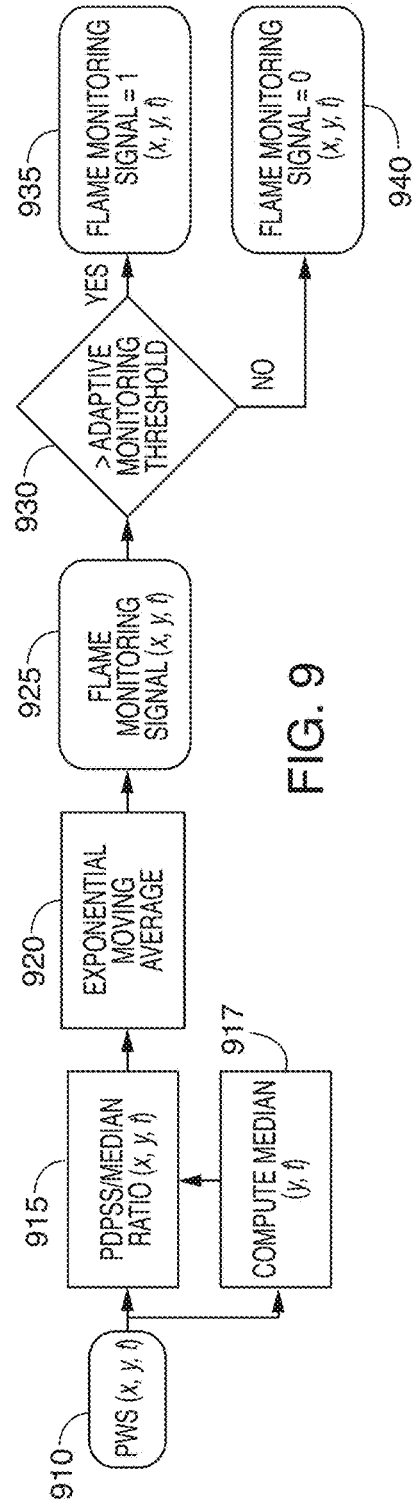
FIG. 9 is a flow chart showing monitoring phase flame detection using wavelet analysis according to one embodiment of the invention.
Figure 10:
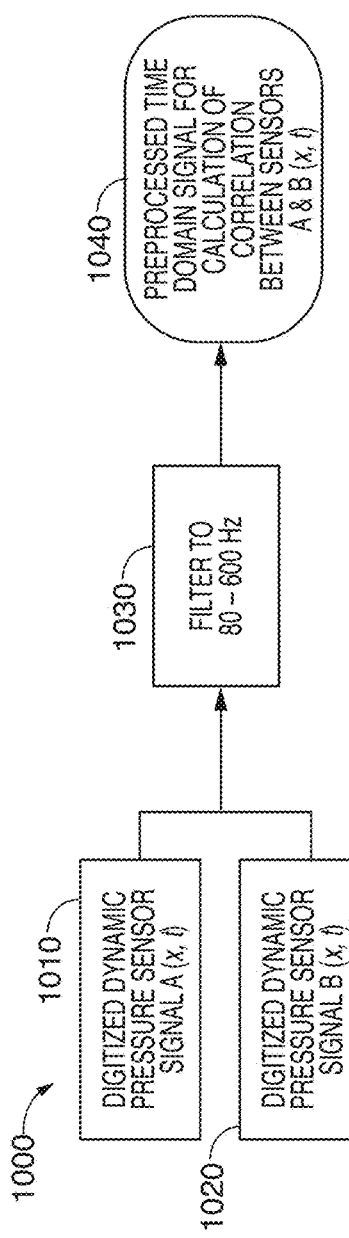
FIG. 10 is a flow chart showing time domain signal preprocessing for correlation according to one embodiment of the invention.

After ignition, a less sensitive technique 900 is deployed in the post-ignition or monitoring phase, as depicted in FIG. 9. In that technique, a median PWS is computed at block 917 and each PWS signal 910 is compared to the median of the baskets at block 915. The amplitude is not considered. The data is smoothed using an exponential moving average 920, to produce a flame monitoring signal 925. If the signal exceeds a threshold, as determined at decision 930, the flame is determined as on, and a flame ignition signal of 1 is output at 935. Otherwise, a flame ignition signal of 0 is output at 940, indicating a flame-off condition.

As in any processing of data, the values calculated (i.e., RMS, PWS, flame ignition signal, and flame monitoring signal) must be computed for some time interval. An example embodiment uses a 0.5 second window. As one can expect, if discrete windows are used for computation, the values will change abruptly as the output changes from one data block to the next block of time.

Figure 8:
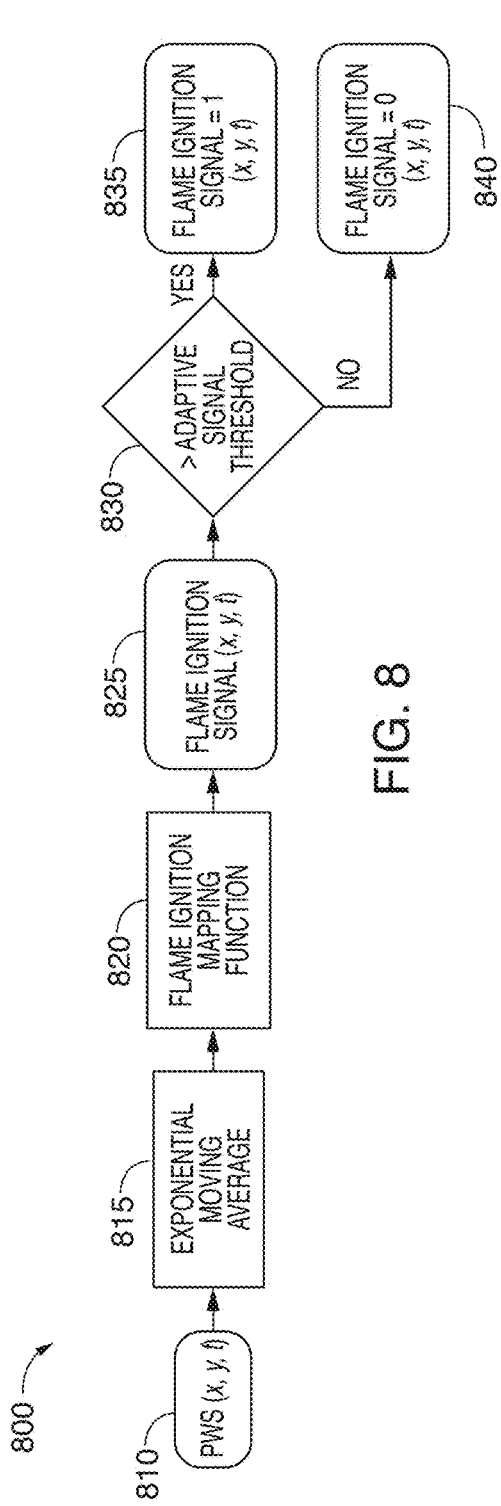
FIG. 8 is a flow chart showing ignition phase flame detection using wavelet analysis according to one embodiment of the invention.

To avoid noise as the data processing period shifts from one time segment to the next, the exponential moving average (FIG. 8, element 815; FIG. 9, element 920) of the time blocks is applied. In each time block, the value of the current block is combined with the value of the previous block with a weighting of 20% from the current block and 80% from the previous block.

The threshold for defining flame on and off is determined adaptively. The real-time data is processed to assess the baseline values and the fluctuation. Adaptive thresholds allow a more precise definition of the flame off that is robust to variations in sensor noise and operating conditions. Engine-to-engine variations will also not be significant since the threshold will be determined from the sensor's current response.

The adaptive threshold is computed differently for the ignition phase and the monitoring phase. In the ignition phase, the flame intensity (FI) level is monitored, and that value is always between 0 and 1. The adaptive ignition threshold is set to the FI level that is 75% of the FI levels of all baskets during off-line operation. The range of possible threshold levels is limited to between 0.1 and 0.7 to limit faults from external noise or faulty sensors.

In the post ignition monitoring phase, the ratio of the filtered PWS signal of each basket to the median signal over all baskets is monitored. If there is a difference of 0.15 in this ratio between baskets with adjacent values, it is flagged as a variation that separates the baskets in flame status. In addition, the adaptive threshold is limited to between 0.5 and 0.9. That prevents signals that are only slightly below the median (having a ratio above 0.9) from being considered abnormal, and it ensures that signals that are very dissimilar to the median level (i.e., having a ratio below 0.5) are detected as abnormal. The method, therefore, allows for a limited spread between the baskets. This approach mimics the well-established blade path temperature spread-based method for preventing un-ignited burners.

Correlation Technique

In addition to defining flame on or flame off based on the energy in each basket in the critical flame dynamic range using wavelet analysis, the technique also, in parallel, evaluates the correlation between multiple dynamic pressure sensors in each basket. The signals used for correlation are preprocessed in the time domain as illustrated in the flowchart 1000 of FIG. 10. Each of the dynamic pressure sensor signals 1010, 1020 is digitized by placing into data blocks of 0.5 second increments. The digitized data is then frequency filtered 1030 into the regime of 80-600 Hz, to yield a processed time domain signal 1040 for calculation of the correlation between the sensors.

Figure 11:
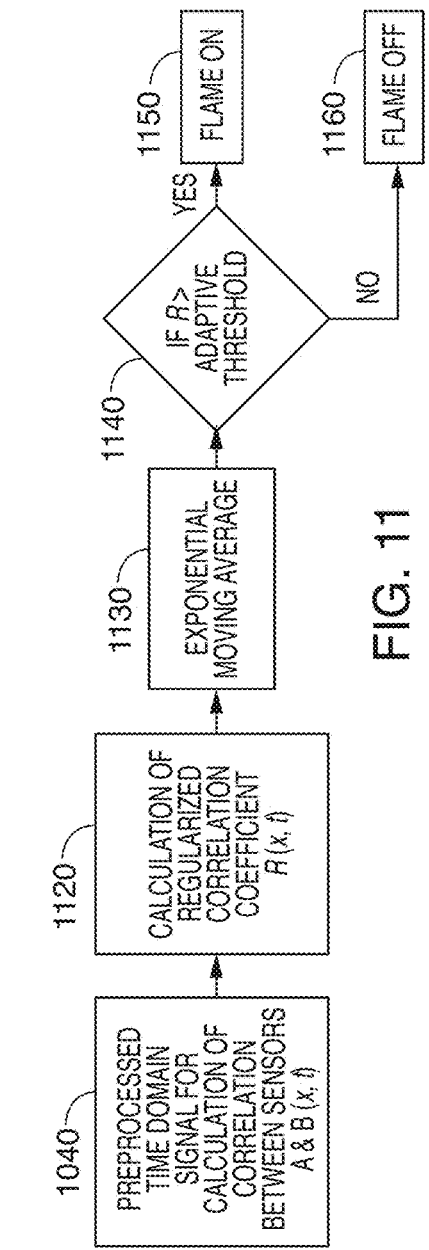
FIG. 11 is a flow chart showing flame detection using a correlation method according to one embodiment of the invention.

Using the processed time domain signal 1040, the correlation method then determines flame status as outlined by the flow chart 1100 of FIG. 11. As represented by block 1120, the signals available from each basket are used to calculate a regularized flame correlation coefficient (R) as:

$$R = \frac{C_{AB}}{\max([\sqrt{C_{AA} \cdot C_{BB}}, 1])}$$

where $C_{AB}$ is the cross-correlation of sensor A and sensor B in one basket;

$C_{AA}$ is the auto-correlation of sensor A with itself, and $C_{BB}$ is the auto-correlation of sensor B with itself.

In this case, $C_{AB} = x_A^T \cdot x_B$, where $x_A$ is the dynamic pressure signal of sensor A, $x_B$ is the dynamic pressure signal of sensor B, and T is the transpose of the vector x.

The denominator in the correlation coefficient computation is limited to values above 1 to prevent amplification of $C_{AB}$ for low energy inputs. Otherwise, random noise as observed in the off-line phase of the engine could sporadically result in high values of the correlation coefficient and thus indicate a false flame on.

In a manner similar to that of the ignition and post ignition period, the dynamic data is filtered at block 1130 to remove narrow band distortions and combustion instabilities. The narrow band distortions are removed by limiting the amplitude of each frequency component to 75% of the highest level over all baskets with maximum allowable amplitude of 1 mbar.

The filtered dynamic data is compared at 1140 to an adaptive threshold computed as:

adaptive threshold=max([max(R−0.2)0.1])

If there is a difference of 0.1 in the correlation coefficients between baskets with adjacent values, it is flagged as a variation that separates the baskets in flame status. In addition, the adaptive threshold is limited between 0.1 and the median value of the correlation coefficient R of all baskets. The minimum limit ensures that low correlation coefficients result in the detection of off-line flames. The upper limit ensures that outliers do not result in false flame out detections. The method, therefore, allows for a limited spread between the baskets. That approach mimics the well-established blade path temperature spread based method for preventing un-ignited burners.

Additionally, autocorrelation methods may be deployed using a single sensor to determine a correlation coefficient.

Determining System Flame Status

Figure 12:
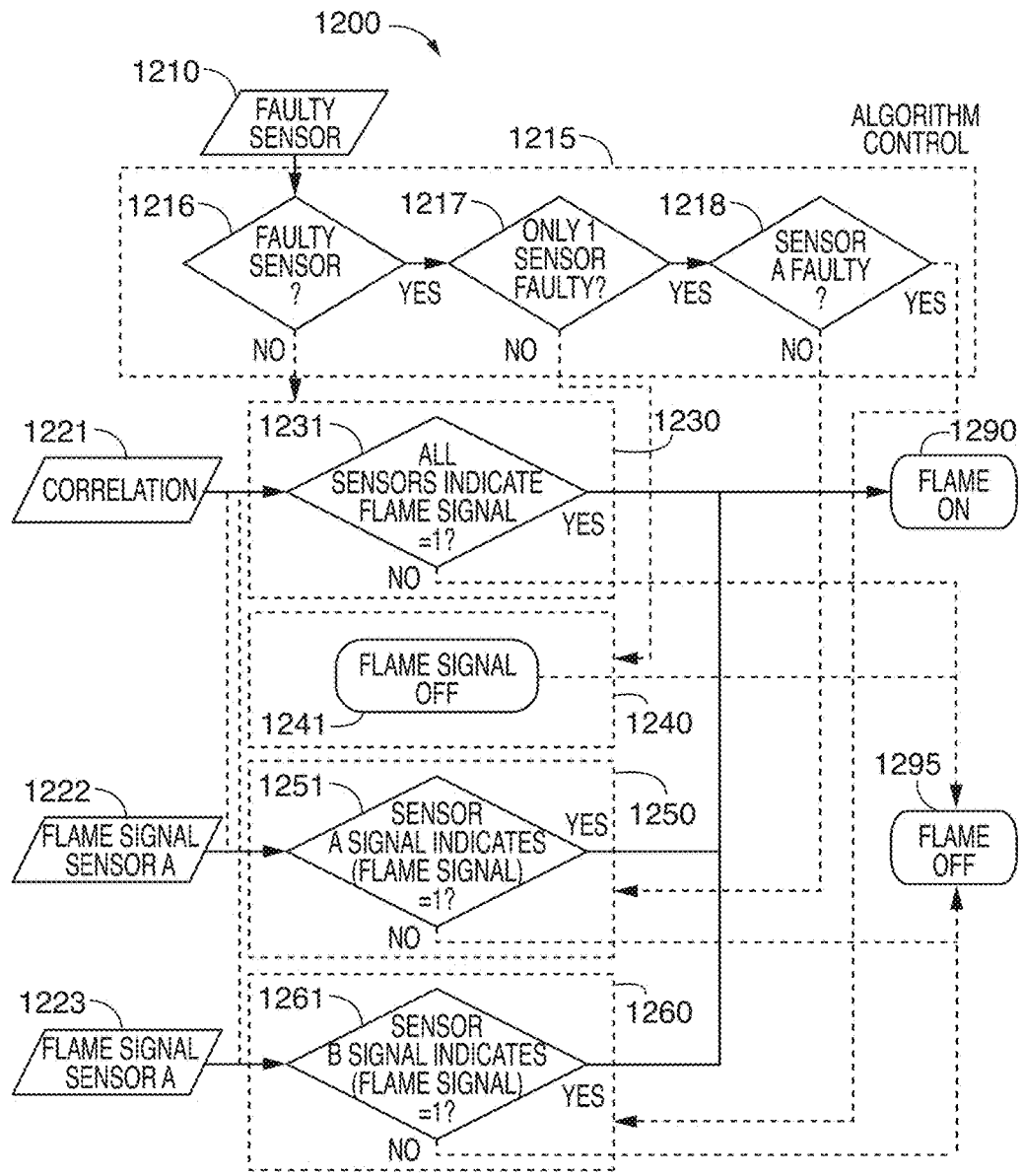
FIG. 12 is a flow chart showing an overall method for determining flame status according to one embodiment of the invention.

System flame status is determined using a technique such as that illustrated by the flow chart 1200 of FIG. 12. The algorithms assign to each basket a value of 1 if it is on and 0 if it is off. Those individual basket signals are then processed by the combustion algorithm to define if the system is on or off. If the combustion rule is that all baskets must be on, then all individual basket signals must be 1 for the signal passed onto the control system to indicate flame on If all sensors on a basket are faulty, the basket is assigned to read flame out. If one sensor is not faulty, then that sensor is used to determine the flame status of that basket with the wavelet method. If the functional sensor indicates flame on, then that basket will be determined to be on, even though two of the three algorithms (i.e., the faulty sensor's wavelet method and the correlation method) for that basket's detection are non-operational because of the faulty sensor. Only one faulty sensor will be allowed, however, per engine.

The flame status logic 1200 includes four decision algorithms 1230, 1240, 1250 and 1260. Logic flow is determined by an algorithm control section 1215, in which one of the four decision algorithms is chosen based on sensor status. The algorithm control section 1215 receives data 1210 indicating sensor status. At decision 1216, a determination is made whether there is a faulty sensor. If not, then the logic flow is directed to algorithm 1230 containing a decision block 1231. The decision block 1231 considers correlation data 1221, flame signal data 1222 from sensor A and flame signal data 1223 from sensor B. If all data indicate that the flame signal=1, then the flame on status 1290 is output.

If a determination is made at decision block 1216 that there is a faulty sensor, then the algorithm control 1215 advances to decision block 1217 and a determination is made whether only a single sensor is faulty. If not, then more than one sensor must be faulty, and the logic flow is directed to algorithm 1240 which contains the rule-based determination 1241 that, if more than one sensor is faulty, then the flame off status 1295 is output.

If a determination is made at decision block 1217 that only one sensor is faulty, then the algorithm control 1215 advances to decision block 1218 and a determination is made whether the faulty sensor is sensor A. If not, then sensor A must be operable, and the logic flow is directed to algorithm 1250 which contains a decision block 1251 that considers data 1222 from sensor A. If the sensor A signal indicates (flame signal)=1, then the flame on status 1290 is output; otherwise, the flame off status 1295 is output.

If a determination is made at decision block 1218 that sensor A is faulty, then sensor B must be operable, and the logic flow is directed to algorithm 1260 which contains a decision block 1261 that considers data 1223 from sensor B. If the sensor B signal indicates (flame signal)=1, then the flame on status 1290 is output; otherwise, the flame off status 1295 is output.

Combustion dynamics monitoring uses frequencies from 15 Hz to 10 kHz. Frequencies below 15 Hz are of little interest for combustion health. The frequency band of 5-10 Hz was chosen for fault detection as faulty signals always show a distinctive pattern in that range. If the amplitudes in this low frequency range are greater than 100 mbar, the sensor is determined to be faulty. In addition, if the amplitudes are below 3.5 mbar for more than 2 seconds, the sensor is determined to be nonresponsive, and therefore faulty.

Figure 13:
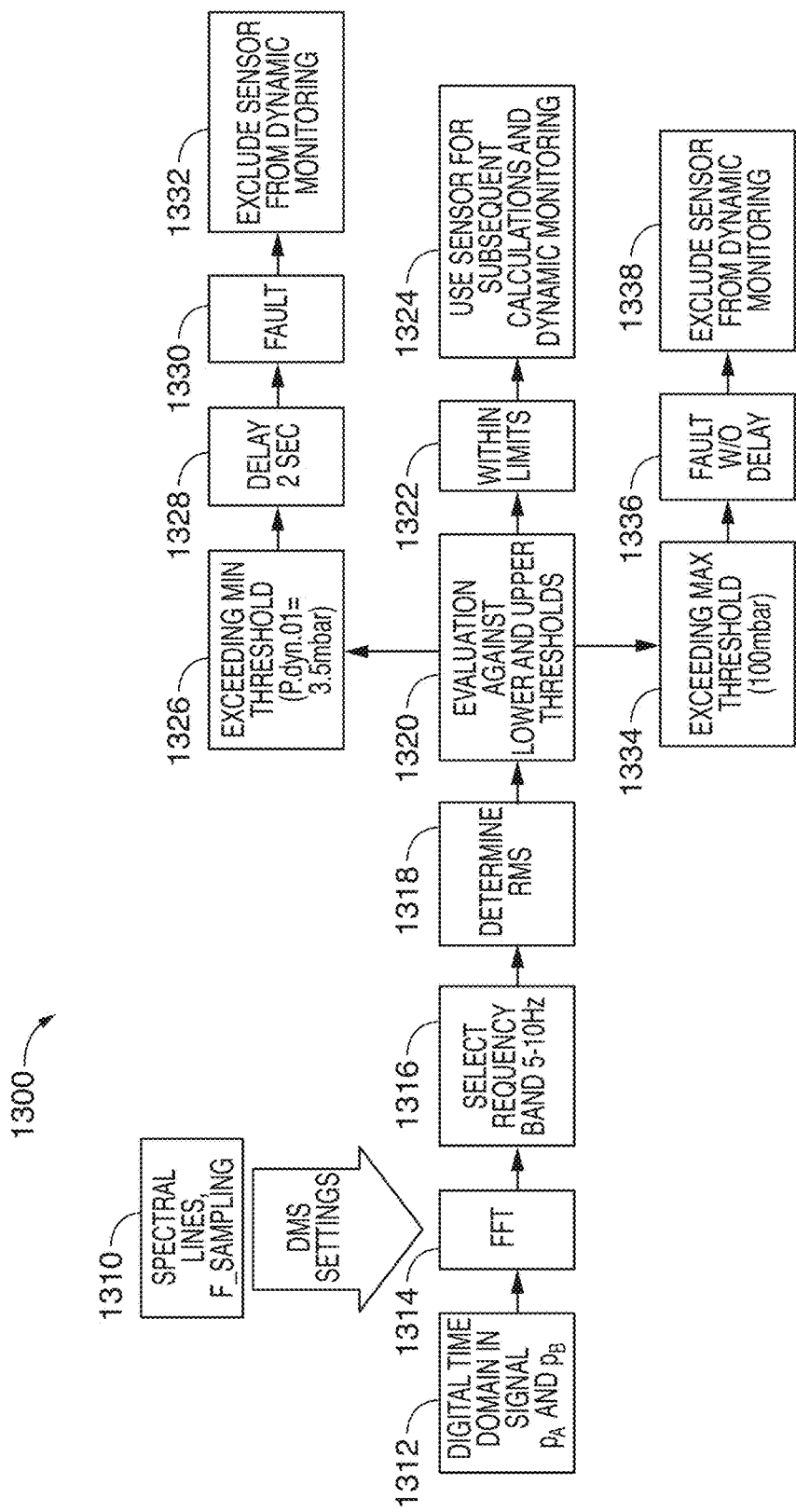
FIG. 13 is a flow chart showing a faulty sensor algorithm according to one embodiment of the invention.

A faulty sensor algorithm 1300 according to aspects of the present disclosure is shown in FIG. 13. Time domain signals 1312 are transformed to frequency domain using fast Fourier transform 1314. Distributed monitoring system settings based on spectral lines and frequency sampling 1310 are utilized. As noted above, a frequency band of 5-10 Hz is selected at block 1316. An RMS value of the data is determined at block 1318.

The data is then evaluated against upper and lower amplitude thresholds of 100 mbar and 3.5 mbar, respectively, at block 1320. If the data values are within the threshold range (block 1322), then data from the sensor is used for subsequent calculations and dynamic monitoring (block 1324). If the data values fall below the lower threshold (block 1326) for more than 2 seconds (block 1328), then a fault is determined (block 1330) and data from the sensor is excluded (block 1332) from dynamics monitoring. If the data rises above the upper threshold (block 1334), then a fault is immediately determined (block 1336) and data from the sensor is excluded (block 1338) from dynamics monitoring Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A method for monitoring flame status in a plurality of combustors of a gas turbine engine, comprising:
   receiving dynamic pressure sensor output signals from dynamic pressure sensors arranged in the combustors, the dynamic pressure sensor output signals being indicative of acoustic oscillations within the combustors;
   for each of the dynamic pressure sensor output signals, computing a preprocessed time-domain signal by digitizing and filtering the dynamic pressure sensor output signal;
   for each of the dynamic pressure sensor output signals, computing a preprocessed wavelet signal using a discrete wavelet transform;
   applying a wavelet-based flame detection algorithm to the preprocessed wavelet signals to determine a wavelet-based flame status for each of the dynamic pressure sensor output signals;
   for each combustor, performing a correlation analysis on one or more of the preprocessed time-domain signals to determine a correlation-based flame status;
   determining the flame status based on the correlation-based flame status and the wavelet-based flame statuses.

2. The method of claim 1, further comprising:
   selecting the wavelet-based flame detection algorithm based on a determination whether the combustors are in an ignition phase or a combustion phase.

3. The method of claim 2, wherein selecting the wavelet-based flame detection algorithm further comprises:
   selecting an algorithm for the ignition phase when a pilot oil valve is open for shorter than an oil ignition time or a pilot gas valve is open for shorter than a gas ignition time;
   selecting an algorithm for the monitoring phase when a pilot oil valve is open for longer than the oil ignition time or a pilot gas valve is open for longer than a gas ignition time;
   selecting no algorithm and terminating the monitoring if both the oil pilot valve and the gas pilot valve are closed.

4. The method of claim 1, wherein the wavelet-based flame detection algorithm selected for ignition phase monitors a flame ignition signal (FI) defined as:

$$FI = \frac{1}{\pi}\tan^{-1}(a \cdot PWS - c \cdot \text{median}(PWS_{1\,to\,x})) - 0.5$$

where PWS is the preprocessed wavelet signal, x is a number of combustors and a and c are empirical parameters to set a relative importance of signal spread to amplitude of the preprocessed wavelet signal values.

5. The method of claim 1, further comprising:
   removing narrow band distortions in the dynamic pressure sensor output signals by limiting an amplitude of each frequency component to 75% of a highest level of that frequency component among all combustors.

6. The method of claim 1, further comprising:
   removing combustion instabilities in the dynamic pressure sensor output signals by limiting a maximum impact of low frequencies to 1 mbar.

7. The method of claim 1, wherein performing the correlation analysis further comprises:
   computing a regularized flame correlation coefficient from auto correlation values of each of two sensors in a combustor and a cross-correlation value between the two sensors; and
   comparing the preprocessed time domain signals with a threshold determined from the regularized flame correlation coefficient.

8. The method of claim 7, wherein computing a regularized flame correlation coefficient further comprises computing $$R = \frac{C_{AB}}{\max\left(\left[\sqrt{C_{AA} \cdot C_{BB}}, 1\right]\right)}$$

where
   $C_{AB}$ is a cross-correlation of a sensor A and a sensor B in the combustor;
   $C_{AA}$ is a auto-correlation of sensor A with itself, and
   $C_{BB}$ is a auto-correlation of sensor B with itself.

9. The method of claim 1, wherein determining the flame status based on the correlation-based flame status and the wavelet-based flame statuses further comprises:
   determining a flame-on status for a combustor only if the correlation-based flame status and each of the wavelet-based flame statuses indicate a flame-on condition.

10. The method of claim 1, wherein determining the flame status based on the correlation-based flame status and the wavelet-based flame statuses further comprises:
    determining a flame-on status for a combustor only if the correlation-based flame status and at least one of the wavelet-based flame statuses indicate a flame-on condition.

11. A system for monitoring a flame in a gas turbine engine combustion chamber, comprising:
    a plurality of dynamic pressure sensors arranged for producing dynamic pressure sensor output signals indicative of acoustic oscillations within a plurality of combustors of the gas turbine engine combustion chamber;

a processor connected for receiving the dynamic pressure sensor output signals from the acoustic sensors;

computer readable media containing computer readable instructions that, when executed by the processor, cause the processor to perform the following operations:

for each of the dynamic pressure sensor output signals, computing a preprocessed time-domain signal by digitizing and filtering the dynamic pressure sensor output signal;

for each of the dynamic pressure sensor output signals, computing a preprocessed wavelet signal using a discrete wavelet transform;

applying a wavelet-based flame detection algorithm to the preprocessed wavelet signals to determine a wavelet-based flame status for each of the dynamic pressure sensor output signals;

for each combustor, performing a correlation analysis on one or more of the preprocessed time-domain signals to determine a correlation-based flame status;

determining the flame status based on the correlation-based flame status and the wavelet-based flame statuses.

12. The system of claim 11, wherein the operations further comprise:
selecting the wavelet-based flame detection algorithm based on a determination whether the combustors are in an ignition phase or a combustion phase.

13. The system of claim 12, wherein selecting the wavelet-based flame detection algorithm further comprises:
selecting an algorithm for the ignition phase when a pilot oil valve is open for shorter than an oil ignition time or a pilot gas valve is open for shorter than a gas ignition time;
selecting an algorithm for the monitoring phase when a pilot oil valve is open for longer than the oil ignition time or a pilot gas valve is open for longer than a gas ignition time;
selecting no algorithm and terminating the monitoring if both the oil pilot valve and the gas pilot valve are closed.

14. The system of claim 11, wherein the wavelet-based flame detection algorithm selected for ignition phase monitors a flame ignition signal (FI) defined as:

$$FI = \frac{1}{\pi}\tan^{-1}(a \cdot PWS - c \cdot \text{median}(PWS_{1\,to\,x})) - 0.5$$

where PWS is the preprocessed wavelet signal, x is a number of combustors and a and c are empirical parameters to set a relative importance of signal spread to amplitude of the preprocessed wavelet signal values.

15. The system of claim 11, wherein the operations further comprise:
removing narrow band distortions in the dynamic pressure sensor output signals by limiting an amplitude of each frequency component to 75% of a highest level of that frequency component among all combustors.

16. The system of claim 11, wherein the operations further comprise:
removing combustion instabilities in the dynamic pressure sensor output signals by limiting a maximum impact of low frequencies to 1 mbar.

17. The system of claim 11, wherein performing the correlation analysis further comprises:
computing a regularized flame correlation coefficient from auto correlation values of each of two sensors in a combustor and a cross-correlation value between the two sensors; and
comparing the preprocessed time domain signals with a threshold determined from the regularized flame correlation coefficient.

18. The system of claim 17, wherein computing a regularized flame correlation coefficient further comprises computing $$R = \frac{C_{AB}}{\max\left(\left[\sqrt{C_{AA} \cdot C_{BB}}, 1\right]\right)}$$

where
$C_{AB}$ is a cross-correlation of a sensor A and a sensor B in the combustor;
$C_{AA}$ is a auto-correlation of sensor A with itself, and
$C_{BB}$ is a auto-correlation of sensor B with itself.

19. The system of claim 11, wherein determining the flame status based on the correlation-based flame status and the wavelet-based flame statuses further comprises:
determining a flame-on status for a combustor only if the correlation-based flame status and each of the wavelet-based flame statuses indicate a flame-on condition.

20. The system of claim 11, wherein determining the flame status based on the correlation-based flame status and the wavelet-based flame statuses further comprises:
determining a flame-on status for a combustor only if the correlation-based flame status and at least one of the wavelet-based flame statuses indicate a flame-on condition.

* * * * *